United States Patent [19]

Baumert et al.

[11] Patent Number: 4,941,704
[45] Date of Patent: Jul. 17, 1990

[54] SUN VISOR FOR VEHICLES

[75] Inventors: Heinz Baumert, Sindelfinger; Ulrich Bruhnke, Ehningen; Ferdinand Greiner, Aidlingen; Siegfried Nothacker, Weil der Stadt, all of Fed. Rep. of Germany

[73] Assignee: Daimler-Benz AG, Fed. Rep. of Germany

[21] Appl. No.: 309,196

[22] Filed: Feb. 13, 1989

[30] Foreign Application Priority Data

Feb. 13, 1988 [DE] Fed. Rep. of Germany ....... 3804586

[51] Int. Cl.$^5$ .............................................. B60J 3/02
[52] U.S. Cl. ................... 296/97.11; 296/97.12; 296/97.1
[58] Field of Search .................. 296/97.12, 97.9, 97.11, 296/97.13, 97.1

[56] References Cited

U.S. PATENT DOCUMENTS

| 2,296,130 | 9/1942 | Westrope | 296/97.11 |
| 2,299,775 | 10/1942 | Westrope | 296/97.11 |
| 2,458,677 | 1/1949 | Brundage | 296/97.11 |
| 2,932,539 | 4/1960 | Galbraith | 296/97.11 |

FOREIGN PATENT DOCUMENTS

| 468319 | 9/1950 | Canada | 296/97.9 |
| 470998 | 1/1951 | Canada | 296/97.11 |
| 2426398 | 12/1975 | Fed. Rep. of Germany | |
| 8527033 | 8/1987 | Fed. Rep. of Germany | |

Primary Examiner—Margaret A. Focarino
Assistant Examiner—Gary C. Hoge
Attorney, Agent, or Firm—Evenson, Wands, Edwards, Lenahan & McKeown

[57] ABSTRACT

The invention relates to a sun visor for vehicles, having a sun visor body which can bend along its longitudinal extension and can be pivoted out of a rest position into a multiple number of use positions, and which can be held in these positions. In order to ensure that the sun visor body automatically bends in the course of the pivoting process on a bent shaft, the sun visor body is pivotably mounted on a curved through shaft. Between the rotatably mounted end regions of the curved shaft it is guided so as to be rotatable and slideable in the direction of a transverse extension of the sun visor body through an intermediate bearing engaging in bifurcated fashion around an associated longitudinal portion of the curved shaft. The sun visor body is guided so as to be longitudinally displaceable on the curved shaft to allow for correct positioning when the visor body and curved shaft are pivoted to be in front of a side window of a vehicle.

16 Claims, 3 Drawing Sheets

SUN VISOR FOR VEHICLES

BACKGROUND AND SUMMARY OF THE INVENTION

The invention relates to a sun visor for vehicles having a sun visor body which can bend along its longitudinal extension, which can be pivoted out of a rest position into a use position, and which can be held in these positions. The sun visor body has at least one bearing, the bearing axis line of which extends along a longitudinal edge of the sun visor body in an arcuate line and in a plane lying between the rest position and the use position of the sun visor body. The sun visor body is pivotably mounted on the bodywork side of the vehicle and has two end regions being rotatably mounted on an associated shaft portion.

A sun visor of this type is known from German Unexamined Patent Application No. 24 26 398. The embodiments there have a positionally stable bearing axis line during the process of swinging the sun visor body. In addition to their rotatable mounting in the end regions, these embodiments rely on axial support at both ends. Between these axial support points, the flexible sun visor body is held in an arched bending position for the purpose of matching an arcuate form of an associated roof frame above the windshield of the vehicle.

It is because of the outwardly-directed resilient force resulting from the arching that the positional stability of the sun visor body in the two beyond-dead-center positions is provided.

If, when required, the sun visor body is to be swung out of its arched rest position into its use position, it must be transferred in the course of the pivoting process into a position in which it is arched in the opposite direction. Here, compressive loading in the central region of the sun visor body attains maximum values between the two beyond-dead-center positions.

Because of the work of deformation associated with a change in the operating position of the sun visor body, the appearance of the sun visor suffers considerably after only a short period of use, even when high-quality materials are used.

In addition, changing the operating position requires a considerable expenditure of force by the user.

Finally, the principle of operation of that known sun visor means that a very specific use position is automatically taken up by the sun visor body. Individual adaptation of the pivoting position of the sun visor body to the line of sight of the user is thus not possible.

For the above reasons, the object on which the instant invention is based is to further develop a sun visor of the general type for vehicles in such a way that it is possible to change the operating positions of the sun visor body with a small expenditure of force and that individual adjustment of the sun visor body can be carried out over a large pivoting range of use.

By having the sun visor body pivotably mounted on a curved through shaft and rotatably mounted to the end regions of the shaft, the visor body is guided so as to be rotatable and slideable in the direction of the transverse extension of the sun visor body by an intermediate bearing engaging bifurcated fashion around an associated longitudinal portion of the curved shaft. Also, the sun visor body is guided so as to be longitudinally displaceable on the shaft.

Thus, the sun visor body is transferable under forcible guidance by the bent shaft to opposite bending positions in the course of the swinging process. During this, the compressive forces acting on the sun visor body are relatively small, since during the reversal in bending, the sun visor body can pass through a straight, flat expanded intermediate position. However, this circumstance dictates a change in the sun visor body length surrounding the shaft. This length extension is taken into account by an axial displaceability of the said sun visor body on the shaft. The shaft must likewise have an excess length matched to the expanded position.

For reasons of weight, it is advantageous if the through shaft consists of a round tube.

A particularly compact construction of the sun visor results if the shaft runs in the cross-section of the sun visor body. Admittedly, the sun visor body must in this case be traversed by a slot.

This slot is preferably designed as a guide slot, and it can assume both the function of rotatable mounting at the ends and the function of intermediate mounting by a corresponding wall shape.

For the intermediate mounting of the shaft in the guide slot, the shaft must be supported at at least one bearing location on the walls of the slot. Alternatively, a plurality of bearing locations may be provided, distributed of course over the intermediate mounting zone.

Because the non-rotationally-symmetrical shape of the guide slot, a shell construction has been chosen for the latter. By virtue of molding the walls of the slot integrally onto a flexurally elastic supporting structure of the sun visor body, the number of joining operations during the production of the sun visor body can be minimized if a jointed connection has already been provided for the supporting structure.

The sun visor body can additionally be pivoted in front of a side window adjoining the windshield by pivoting of the curved shaft. This rotation can be resisted by a spring bias connection of the shaft to the roof of the vehicle. The curved shaft can be telescopic to allow for rearward shifting of the visor body when the visor is pivoted against a side window of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
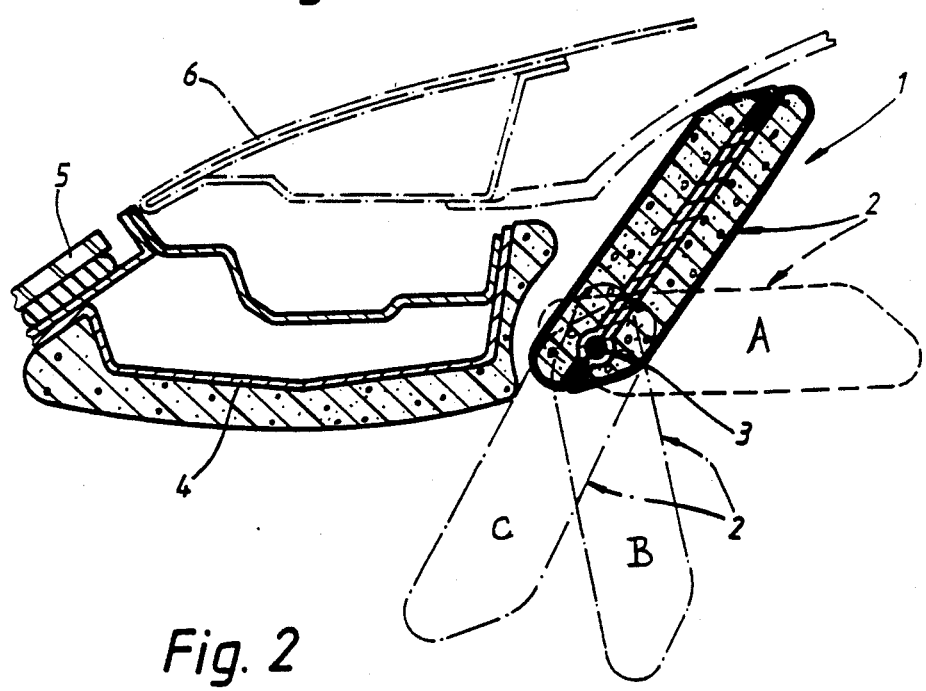
FIG. 1 shows a side section through a sun visor arranged in a motor vehicle.

The installation position of a sun visor 1 in a convertible top automobile is shown in FIG. 1, wherein the sun visor comprises as principal components a sun visor body 2 and a curved shaft 3. The curved shaft 3 runs in a horizontal plane behind an upper frame profile 4 of a screen frame of a vehicle windshield pane 5. For reasons of aerodynamics, the windshield 5 has a shallow angle of inclination and is arcuately curved. For the purpose of matching this curvature, the frame profile 4 is also correspondingly curved. In order to achieve optimum head room, the curved shaft 3 is situated opposite the frame profile 4, at a constant distant from it. That is, it runs parallel to the direction of extension of the frame profile 4. At the same time, the distance is dimensioned such that the sun visor body 2 can be pivoted over a pivoting range past the frame profile 4 without contacting the profile 4 or a covering thereof. A minimum pivoting angle of about 170° is envisaged as the pivoting range, and this should still be achievable with the top convertible cover 6 in a closed position. As seen in cross-section in its rest position, the sun visor body 2, which is traversed by the curved shaft 3 in the region of one longitudinal edge thereof, runs obliquely backwards, starting from the curved shaft 3, towards the canopy of the top cover 6. The longitudinal edge of the sun visor body 2 which is remote from the curved shaft 3 can rest against the canopy of the top cover 6, as shown in solid lines in FIG. 1. This rest position necessitates a minimum installation space requirement, especially since, by reason of the curved shaft 3 being held fixed in relation to the frame profile 4, the flexible sun visor body 2 bends in such a way that its non-visible (from the driver portion) side lies opposite the transition zone between the frame profile 4 and the canopy of the top cover 6 over the entire length of the sun visor body 2 at the distance illustrated. Note the bending curvature at the top of FIG. 5. Also as seen in cross-section, the sun visor body 2 can be pivoted by an angle of about 50° out of the rest position into an intermediate horizontal position (A) in which it lies in the horizontal plane of flexure of the curved shaft 3. As a result of the mounting, which is explained in greater detail below, the sun visor body 2 adapts to this plane of flexure by assuming a straight and flat expanded position along its length. As the sun visor body 2 is pivoted further, it reaches, after an angle of about 80°, a pivoting range for use (B) provided here of about 40°. In this pivoting range for use (B), the sun visor body 2 is bent in a manner opposite to that in the rest position. Any intermediate position can be chosen steplessly, and can even pivot further to position (C).

The positional fixing of the set use angle of the sun visor body 2 as well as positional fixing in the rest position is effected by frictional force due to frictional engagement of the curved shaft 3 with the elastic prestress of the bent sun visor body 2. The resistance of the sun visor body 2 to flexural deformation is decisive for the retention forces of the sun visor body 2 in the intermediate position.

The automobile positional fixing behavior is achieved solely via the special manner of mounting the sun visor body 2 on the curved tubular shaft 3.

Figure 2:
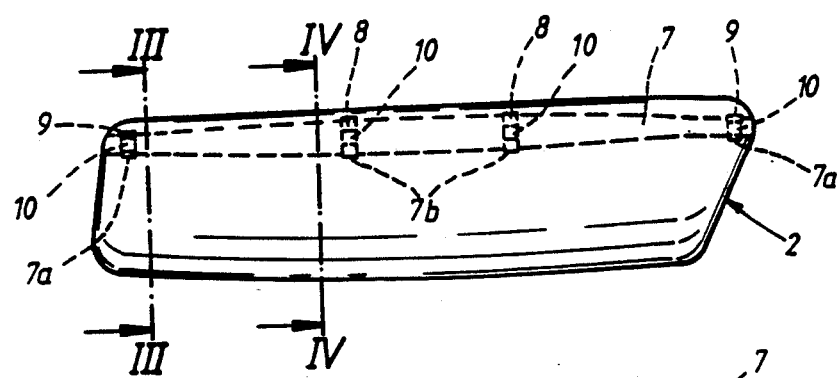
FIG. 2 shows a plan and separate view of a sun visor body according to FIG. 1.

With regard to this, FIG. 2 shows a preferred embodiment of the sun visor body 2, in which four bearing locations for the curved shaft 3 are provided in the interior of the sun visor body 2. These bearing locations lie in a guide slot 7 which passes through the entire length of the sun visor body 2 in the vicinity of one longitudinal edge. In both end regions of the guide slot 7, the clear opening of the guide slot 7 is that of a circle diameter, which is slightly greater than the diameter of the curved shaft 3. Starting from the circular end regions, the guide slot 7 widens increasingly as it approaches towards the center of the sun visor body 2 up to a maximum dimensional width which corresponds essentially to a distance which is equal to twice the circle diameter. However, the clear height of the guide slot 7 in the direction of the thickness of the sun visor body 2 remains unchanged over the entire length of the guide slot 7, with the result that the clear opening of the guide slot 7 corresponds in the central region to a rectangular shape having semicircular narrow sides (note FIG. 4). The increase in the width of the guide slot 7 is dimensioned such that the semicircular narrow sides of the guide slot 7 run in mirror symmetry to one another relative to the longitudinal central plane of said guide slot and their curvature is matched to the curved shape of the shaft 3. The shaft 3 is curved to project forwardly at its center, closer to profile 4, and so that when the sun visor body 2 is horizontal, the curvature will be taken up by the elongated portion of the slot 7 and hence the visor body 2 will be flat. When the visor body 2 is rotated, the curved portion of the curved shaft 3 moves relative to the elongated slot 7 against the narrow portion of the slot 7. Here, there is no excess space in the slot so the visor body 2 is constrained to follow the curvature of the shaft 3. Thus, in FIG. 5 one can see the visor is bent and does not lay flat.

For the formation of the bearing locations, the guide slot 7 is widened partially at its ends and on both sides of the center portion to form a circumferential annular groove 7a and 7b. Associated elastomer rings 8 and 9 respectively, which have a deformation behavior which approaches that of foam rubber, are inserted into these annular grooves 7a and 7b. All elastomer rings 8 and 9 are provided with a central through-bore 10 which is matched to the diameter of the curved shaft 3. This matching is carried out in such a way that, although, after being pushed onto the curved shaft 3, the elastomer rings 8 and 9 can still be displaced or rotated on the circumference of the curved shaft 3, they are nevertheless somewhat compressed. The latter intensifies the positive connection between the outer circumference of the elastomer rings 8 and 9 and the associated annular grooves 7a and 7b.

In order to make possible simple production and mounting of the sun visor body 2 on the curved shaft 3, the supporting structure of the sun visor body 2 consists of two essentially mirror-image half-shells 11a and 11b of flexurally elastic plastic which are laid one on top of the other over an area and into which the respective halves of the walls of the guide slot 7 are integrally molded. These half-shells 11a and 11b can thus be fitted on the curved shaft 3 by joining over an area. Particularly time-saving joining methods of a type known per se, such as clips or similar expanding connections, can be used here. It furthermore has an advantageous effect on the assembly time if each half-shell 11a and 11b has already been provided with the associated cladding covering components prior to the joining procedure.

Figure 3:
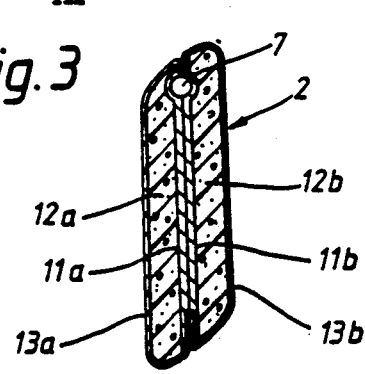
FIG. 3 shows a section in accordance with the line III—III in FIG. 2.
Figure 4:
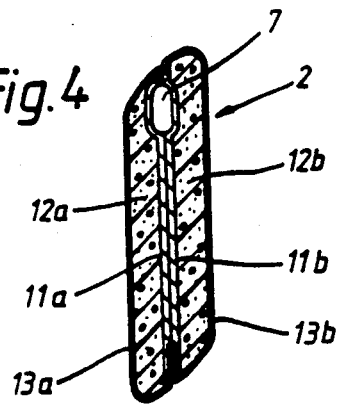
FIG. 4 shows a section in accordance with the line IV—IV in FIG. 2.

A corresponding construction can be seen from FIGS. 3 and 4. In this arrangement, an elastomer foam profile 12a and 12 b respectively, which has been sheathed in a flexible film 13a and 13b, respectively, is in each case applied to that side of the half-shells 11a and 11b which faces away from the line which joins the two half-shells.

The halves of the sun visor body 2 which are associated with the half-shells 11a and 11b can thus be produced economically as molded foam parts of the customary type.

Figure 5:
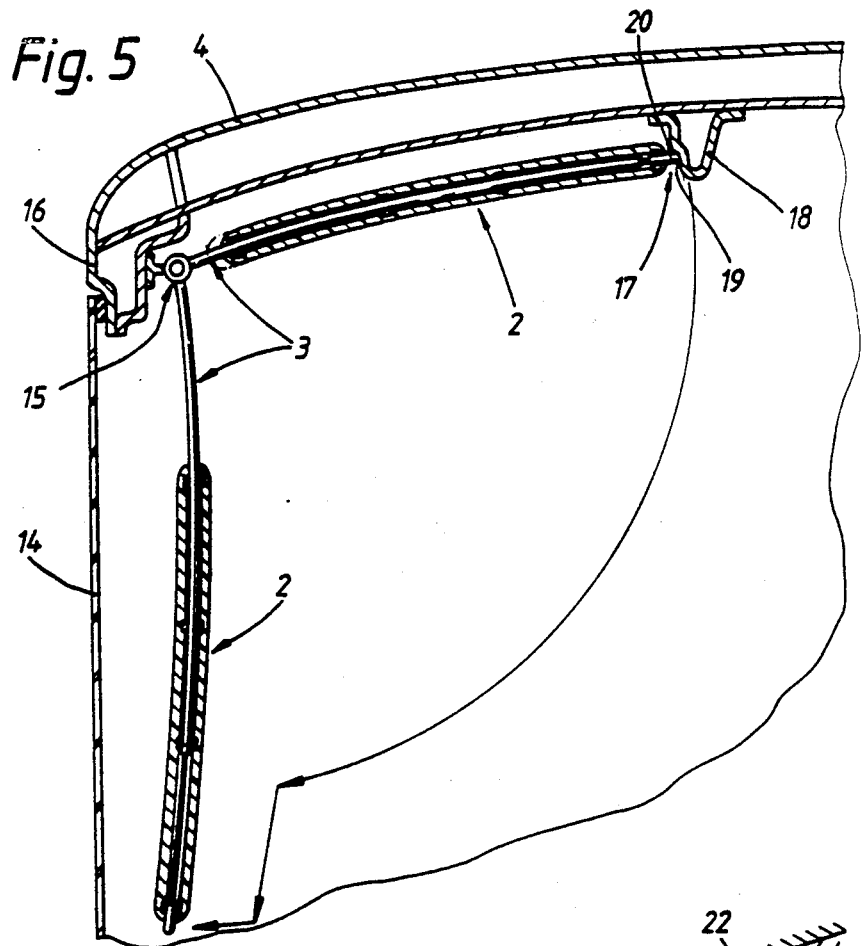
FIG. 5 shows a plan view through the sun visor arrangement from FIG. 1.

Although the sun visor body 2 can be fitted to a stationary shaft, the curved shaft 3 in the embodiment seen in FIG. 5, allows the curved shaft to be pivoted so that the sun visor body 2 can be employed optionally behind the frame profile 4, or along a side window 14. For this purpose, one end of the curved shaft 3 is affixed on an associated vehicle A-column 16 by a hinge joint 15. The geometrical axis of the hinged joint 15 runs vertically with respect to the vehicle body and thus enables the curved shaft 3 to be swung to the side and forwards again in one vertical plane. By reason of this articulation of the curved shaft 3 via the hinge joint 15, a fixing point, at which the curved shaft 3 can be fixed at its design-determined distance from the frame profile 4, is provided for the second and non-pivoted end of the curved shaft 3.

Figure 6:
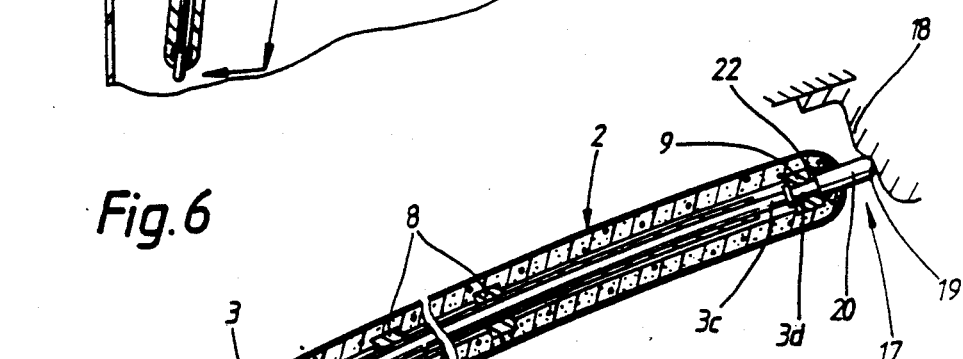
FIG. 6 shows the mounting of the sun visor body according to FIG. 5, as an enlarged detail.

To ensure that such a fixing can be released easily, an engagement arrangement 17 is used. The engagement arrangement 17 comprises a holder 18 attached rigidly to the frame profile 4 and having a cup-shaped engagement recess 19 and an engagement pin 20 which forms the counterpart to the engagement recess 19. The pin 20 is guided so as to be axially slideable along the visor body 2 and is under a spring load. Preferably, the engagement pin 20 is formed by the free end of the curved shaft 3 itself, the end protruding from the sun visor body 2. This is particularly applicable to the present case, in which the curved shaft 3 offers the advantage that it can be extended into the vicinity of the rear edge of the side window 14 after the sun visor body has been swung over to cover the side window 14. It is only by this means that the possibility of extensive protection against dazzling sunlight streaming in from the side is provided. The portion of the vehicle seat fore and aft, as well as the location of the sun, will determine how much lengthwise extension is needed. The detailed construction of the telescopic curved shaft 3 is more clearly discernible from the enlarged sectional representation according to FIG. 6.

A solid longitudinal curved portion 3a, which extends only a short distance into the sun visor body 2, is first of all provided on the hinge side. The curved longitudinal portion 3a merges with the same diameter into a curved tubular portion 3b which almost traverses the entire length of the sun visor body 2. A lengthwise curved round rod 3c, which is thickened in an end portion 3c protruding from the tubular portion 3b, is guided so as to be axially slideable in this tubular portion 3b. The end portion 3d leads out of the sun visor body 2 and therefore merges into the engagement pin 20. For the purpose of spring loading the engagement pin 20, a helical compression spring 21, which is supported axially between the longitudinal portion 3a and the adjacent end of the round rod 3c, is pushed into the clear opening of the tubular portion 3b. The clear opening of the tubular portion 3b is thus used as part of the axial guidance of the helical compression spring 21.

In order to ensure that the sun visor body 2 cannot be displaced with respect to the short end portion 3d, an annular groove 22 into which the elastomer ring 9 positively engages, is recessed into the end portion 3d over the width of the elastomer ring 9. As a result of the axial support associated therewith, it is ensured that relative movements between the sun visor body 2 and the curved shaft 3, whether in the course of the extension movement of the round rod 3c out of the tubular portion 3b or in the course of a rotation of the sun visor body 2 on the curved shaft 3, can only be compensated in the axial direction by one elastomer ring 9 and both elastomer rings 8 sliding along the circumference of the curved portion 3b and the longitudinal portion 3a.

The path of advance during the rotation of the sun visor body 2 is illustrated by a position indicated by means of broken lines in FIG. 1.

Figure 7:
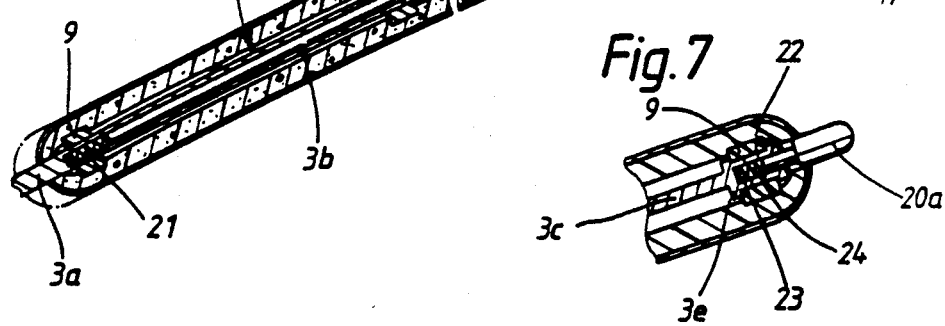
FIG 7 shows a variant of the engagement arrangement of the shaft from FIG. 6.

FIG. 7 shows a variant of the end portion 3d and shows a helical compression spring 23 being integrated into an end portion 3e itself. While the type of axial and radial support of the end portion 3e corresponds to that of end portion 3d, i.e., is likewise effected via the elastomer ring 9. The end portion 3e additionally has a cylindrical bore 24, in which the helical compression spring 23 is axially guided. The helical compression spring 23 is prestressed via a cylindrical shaft of an engagement pin 20a which is mounted so as to be axially displaceable in the bore 24 and is held in its starting position by a stop (not illustrated).

Irrespective of whether the principle of helical compression spring 21 or that of helical compression spring 23 is employed, engagement of the engagement arrangement 17 results automatically if, in the pushed-in condition, the curved shaft 3 is pressed towards the frame profile 4. In this case, the end of the engagement pin 20 or 20a runs onto a sloping surface of the holder 18, the helical compression spring 21 or 23 being pushed in somewhat further. If the engagement pin 20 or 20a reaches the aligned end position, it engages under the spring loading into the engagement recess 19 and then exerts the desired retention forces.

In the text which follows, an explanation is given of how the sun visor body 2 automatically undergoes flexural deformation as a function of its pivoting angle on the curved shaft 3. For this purpose, use is made of a simple structural model, from which the principle of operation is easily seen. In this structural model, a sun visor body 2' consists only of a thin, flat plate of resilient plastic, the resiliency behavior of which is approximately comparable to that of the joined half-shells 11a and 11b. The sun visor body 2' can accordingly only be brought out of an original position, in which it is expanded straight, into an arcuate shape under the influence of external bending forces. As soon as sufficient external bending forces are no longer present, the sun visor body 2' spring back automatically into its flat expanded position. Instead of the guide slot 7 in the case of the sun visor body 2, three bearing clips 25 are screwed onto a transverse side of the sun visor body 2' in a comparable arrangement. The clear opening of the bearing clips 25 at the end corresponds here to essentially the cross-section of the guide slot 7 in its end regions, and that of the bearing clip 25a corresponds essentially to the clear opening of the guide slot 7 in the center. The three bearing clips 25 and 25a surround a curved shaft tube 3', the length, diameter and bending radius of which corresponds to that of the curved shaft 3. The curved shaft 3' is rigidly fixed at its ends.

During the pivoting of the sun visor body 2' on the curved shaft tube 3' into angular positions which correspond to those of the sun visor 1, the dependency of the bending of the sun visor body on the pivoting angle can clearly be seen.

Figure 8:
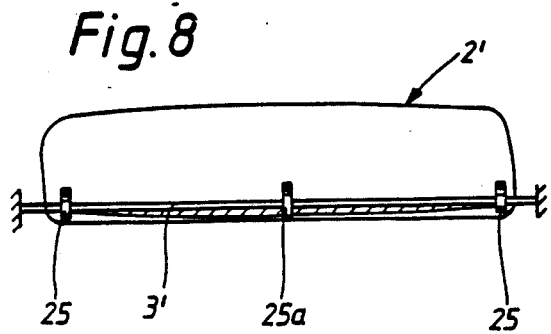
FIG. 8 shows a structural model of the sun visor in a rest position, from the view point of the driver.
Figure 9:
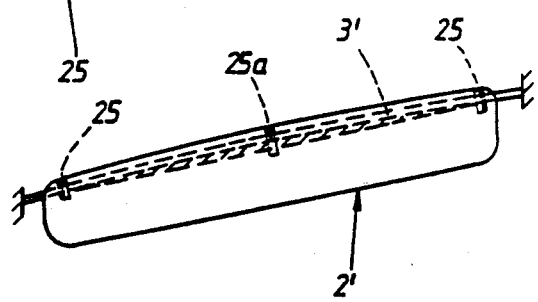
FIG. 9 shows the structural model according to FIG. 8 in plan view.
Figure 10:
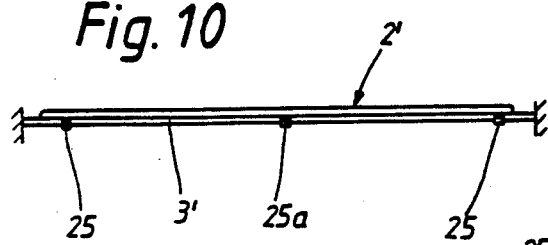
FIGS. 10 and 11 show the corresponding views of the structural model in an intermediate position of the sun visor body.
Figure 11:
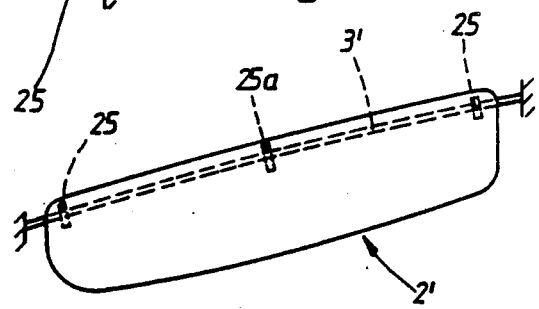

In the rest position according to FIGS. 8 and 9, the sun visor body 2' is, by reason of its three-point articulation, flexurally deformed. The circumference of the curved shaft tube 3' rests against the bearing clip 25a in an end position turned towards the central longitudinal axis of the sun visor body 2'. The outward-directed spring tension of the sun visor body 2' here exerts forces on the curved shaft tube 3' which are directed transversely to the plane of the sun visor body 2'. Since these forces are supported on the circumference of the shaft tube 3', frictional forces are present, which inhibit a relative rotation of the shaft tube 3' in the bearing clips 25 and 25a. These inhibiting forces are dimensioned such that, under customary operating conditions, they are sufficient to immobilize the sun visor body 2'. They can, however, be overcome without problems by manual intervention, enabling the use position to be brought about without great expenditure of force. In the course of the pivoting procedure associated with the sun visor body 2', the intermediate position, according to FIGS. 10 and 11 (position A, FIG. 1), is first of all passed through, said intermediate position being a neutral position between two mutually opposite bending positions. The intermediate position lies in the horizontal plane through the curved shaft tube 3'. Since the vertical cross-section, which is predetermined by the bearing clip 25a, corresponds to the diameter of the clips 25, which provide rotatable mounting only, the clips 25 come into longitudinal alignment with the bearing clip 25a. As a result, the sun visor body 2' can spring back into its original flat expanded position. To ensure that this procedure is possible without renewed bending of the sun visor body 2' about a neutral axis running perpendicular to the plane of the latter, the bearing clip 25a is displaced relative to the curved shaft tube 3', until the curved shaft tube 3', in the opposite end position, rests against the bearing clip 25a. This relative transverse advance of the curved shaft tube 3' between the bearing clips 25 is illustrated by a hatched area. The intermediate position of the sun visor body 2' is achieved without compressive loading of the latter if two of the three bearing locations permit axial displacement on the curved shaft tube 3', since the expansion procedure of the sun visor 2' is associated with an increase in the bearing length.

Figure 12:
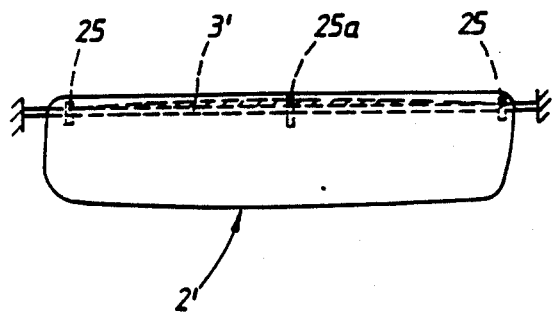
FIGS. 12 and 13 show the views of the sun visor body which correspond to views 8 and 9, in a use position.
Figure 13:
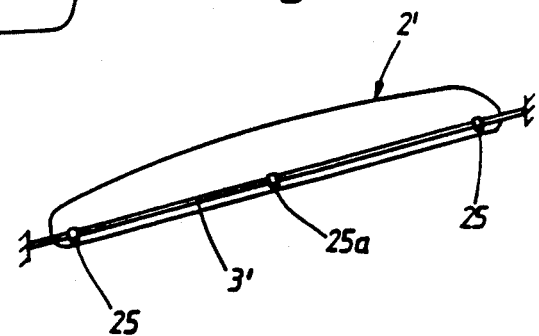

As the sun visor body 2' is pivoted further, out of the intermediate position and into the pivoting range for use, of which FIGS. 12 and 13 show on position (position B in FIG. 1), the sun visor body 2' is bent via its articulation in a manner opposite to the rest position, the central region of the curved shaft tube 3' again assuming its end position in the bearing clip 25a, said end position being near to the central longitudinal axis. Since the sun visor body 2' is more markedly bent in the positions of its pivoting range for use than in the rest position, it accordingly also has the shortest bearing length here, the minimum being in a dazzle-prevention position at an angle of 90° from the intermediate position. This circumstance is taken account of by a displacement path on the curved shaft tube 3' to be established according to the design. For the automatic immobilization of the sun visor body 2' on the curved shaft 3' over the pivoting range of use, what was stated in relation to the rest position applies analogously.

The processes clearly visible from the structural model and which occur during the adjustment of the sun visor body 2' correspond exactly to those which occur during the adjustment of the sun visor body 2 on the curve shaft 3 and are therefore not specially explained.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A sun visor for vehicles having:
   a sun visor body which can bend along its longitudinal extension, which can be pivoted out of a rest position into a plurality of use positions, and which can be held in these positions;
   at least one bearing having a bearing axis line which extends along a longitudinal edge of the sun visor body in an arcuate line;
   pivot means for the pivotable mounting of the sun visor body on a side body of the vehicle;
   the sun visor body being rotatably mounted at two end regions on an associated shaft portion of a curved shaft attached to the pivot means;
   the sun visor body being pivotably mounted on the curved shaft between the rest position and the use positions;
   the sun visor body between its rotatably mounted end regions being guided so as to be rotatable and slideable in the direction of a transverse extension of the sun visor body by an intermediate bearing, engaging in a bifurcated fashion around an associated longitudinal portion of the curved shaft wherein the sun visor body without translation along the curved shaft, automatically changes its bend from a concave configuration along its longitudinal extension, to a flat configuration along its longitudinal extension, and then to a convex configuration along its longitudinal extension as the sun visor body is rotated about the curved shaft from its rest position into its use positions, due to different forces being applied by the curved shaft to end portions of the sun visor body then to a portion of the curved shaft of the sun visor intermediate its end portion; and
   the sun visor body being also guided so as to be longitudinally displaceable on the shaft.

2. A sun visor according to claim 1, wherein the sun visor body is secured axially at one bearing location against sliding on the curved shaft.

3. A sun visor according to claim 1, wherein the curved shaft is formed by a tubular body.

4. A sun visor according to claim 1, wherein the curved shaft is integrated into the sun visor body over the length of the latter.

5. A sun visor according to claim 4, wherein the sun visor body has a guide slot for the curved shaft;
   said guide slot widening increasingly towards the center of the sun visor body from initial cylindrical cross-section ends of visor body where the curved shaft exits, to an oval slot cross-section of uniform clear height; and wherein rounded portions of the oval slot region bulge outwards in mirror symmetry relative to the central longitudinal plane of the guide slot in accordance with the curvature of the shaft.

6. A sun visor according to claim 5, wherein the guide slot is circumscribed by wall portions which are integrally molded on a flexurally elastic supporting structure of the sun visor body.

7. A sun visor according to claim 6, wherein the supporting structure comprises two essentially mirror-image half-shells of plastic, which can be joined.

8. A sun visor according to claim 1, wherein that the sun visor can be pivoted as a whole from its position behind a windshield of a vehicle into a position running approximately parallel to the associated side window of the vehicle.

9. A sun visor according to claim 8, wherein one end of the curved shaft protrudes beyond the length of the sun visor body and is affixed on the body of the vehicle by a pivot joint; and another end of the curved shaft being securable in a position behind the windshield of the vehicle.

10. A sun visor according to claim 9, wherein an engagement arrangement is provided for the securing of the curved shaft to inhibit pivoting of the pivot joint.

11. A sun visor according to claim 10, wherein engagement arrangement comprises an engagement pin which cooperates with a corresponding engagement recess on the vehicle.

12. A sun visor according to claim 11, wherein the other end of the curved shaft has the engagement pin mounted thereat so as to be axially displaceable and able to engage against a spring bias into the engagement recess which is fixed to the roof frame of the vehicle.

13. A sun visor according to claim 9, wherein the curved shaft is uniformly curved over the length of the sun visor body in a manner corresponding to a portion of a circular arc, and wherein the curved shaft consists of a plurality of rod elements interacting telescope-fashion.

14. A sun visor according to claim 13, wherein in an end portion of an extendable rod element is thickened to the diameter of a rod element guiding it.

15. A sun visor according to claim 13, wherein the spring bias is caused by a compression spring element arranged for spring-loading the engagement pin in a cylindrical guide of one rod element.

16. A sun visor according to claim 5, wherein the diameter of the curved shaft is less than the clear height of the guide slot, and wherein the curved shaft is supported free of play between mutually opposite guide slot walls, in a vertical direction of the guide slot, via a plurality of elastomer rings distributed over the length of the sun visor body.

* * * * *